United States Patent
Kairali et al.

(10) Patent No.: US 11,711,679 B2
(45) Date of Patent: Jul. 25, 2023

(54) CONTEXT AWARE CLOUD SERVICE AVAILABILITY IN A SMART CITY BY RENTING TEMPORARY DATA CENTERS

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/448,211

(22) Filed: Sep. 21, 2021

(65) Prior Publication Data
US 2023/0085719 A1    Mar. 23, 2023

(51) Int. Cl.
| H04W 4/44 | (2018.01) |
| H04W 4/021 | (2018.01) |
| H04W 4/50 | (2018.01) |
| H04W 4/24 | (2018.01) |
| H04W 4/02 | (2018.01) |

(52) U.S. Cl.
CPC ............ *H04W 4/44* (2018.02); *H04W 4/021* (2013.01); *H04W 4/023* (2013.01); *H04W 4/24* (2013.01); *H04W 4/50* (2018.02)

(58) Field of Classification Search
CPC ....... H04W 4/021; H04W 4/023; H04W 4/24; H04W 4/44; H04W 44/50
See application file for complete search history.

(56) References Cited

U.S. PATENT DOCUMENTS

| 9,648,107 | B1* | 5/2017 | Penilla ............... G06F 3/04886 |
| 10,203,699 | B1* | 2/2019 | Kim ................ G08G 1/096775 |
| 10,791,543 | B2 | 9/2020 | Tseng |
| 10,988,143 | B2* | 4/2021 | Cheaz .................... G05D 1/021 |
| 11,003,184 | B2* | 5/2021 | Magalhäes de Matos ................. H04L 67/10 |
| 11,442,457 | B2* | 9/2022 | Kwatra ............... G05D 1/0088 |
| 2015/0032846 | A1* | 1/2015 | Doken .................. H04L 67/141 709/217 |
| 2017/0197617 | A1* | 7/2017 | Penilla .................. H04W 4/029 |
| 2018/0081360 | A1* | 3/2018 | Bostick ................. G06Q 50/30 |
| 2018/0113464 | A1* | 4/2018 | Bostick ................. G06Q 10/04 |
| 2018/0146323 | A1 | 5/2018 | Tseng |
| 2018/0217594 | A1* | 8/2018 | Greenberger .......... G08G 1/202 |
| 2019/0132706 | A1 | 5/2019 | Altintas |
| 2019/0132819 | A1 | 5/2019 | Tseng |
| 2019/0155651 | A1* | 5/2019 | Di Cairano-Gilfedder ................. G06F 9/5061 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Jean A Gelin
(74) *Attorney, Agent, or Firm* — Elliot J. Shine

(57) ABSTRACT

The present invention may include a computer identifies an event in an area. The computer predicts a demand for one or more cloud services for the event. The computer identifies a vehicle in an area of the event, where the vehicle have a dynamic vehicle cloud server and the computer caches the one or more cloud services for the event to the dynamic vehicle cloud server.

20 Claims, 6 Drawing Sheets

(56) References Cited

U.S. PATENT DOCUMENTS

| | | | |
|---|---|---|---|
| 2019/0174276 A1* | 6/2019 | Mineiro Ramos de Azevedo | H04W 4/38 |
| 2019/0340928 A1* | 11/2019 | Goldman | G08G 1/202 |
| 2019/0354114 A1* | 11/2019 | Goldman | G05D 1/0297 |
| 2020/0005633 A1* | 1/2020 | Jin | G06F 21/6254 |
| 2020/0162463 A1* | 5/2020 | Dykstra | H04L 63/10 |
| 2020/0226921 A1 | 7/2020 | Higuchi | |
| 2020/0257298 A1 | 8/2020 | Ucar | |
| 2020/0283002 A1* | 9/2020 | Gupta | G05D 1/0297 |
| 2020/0287960 A1* | 9/2020 | Higuchi | G08G 1/22 |
| 2020/0313959 A1 | 10/2020 | Higuchi | |
| 2021/0109544 A1* | 4/2021 | Rakshit | G05D 1/0297 |
| 2021/0176613 A1* | 6/2021 | Purkayastha | H04W 76/12 |
| 2021/0179095 A1* | 6/2021 | Penilla | H04L 67/52 |
| 2022/0035365 A1* | 2/2022 | Ucar | G06F 9/5038 |
| 2022/0070634 A1* | 3/2022 | Ucar | H04W 4/44 |
| 2022/0083391 A1* | 3/2022 | Liu | G06F 9/4881 |
| 2022/0179411 A1* | 6/2022 | Joly | G06F 9/5027 |
| 2022/0189646 A1* | 6/2022 | Rodriguez Bravo | H04L 67/12 |
| 2022/0254206 A1* | 8/2022 | Dykstra | H04L 63/08 |
| 2022/0289240 A1* | 9/2022 | Ucar | B60W 40/09 |

OTHER PUBLICATIONS

Paul et al., "Vehicular Cloud," Science Direct, (Abstract), Intelligent Vehicular Networks and Communications, 2017, https://www.sciencedirect.com/science/article/pii/B978012809266800003X?via%3Dihub, 14 pages.

* cited by examiner

CONTEXT AWARE CLOUD SERVICE AVAILABILITY IN A SMART CITY BY RENTING TEMPORARY DATA CENTERS

BACKGROUND

The present invention relates, generally, to the field of computing, and more particularly to context aware cloud service availability.

A smart city is an urban area that uses different types of electronic methods and sensors to collect data. Insights gained from that data are used to manage assets, resources and services in an optimal mode. Furthermore, that data may be used to improve the operations across the city. The data may include data collected from citizens, devices, buildings, vehicles and assets that is then processed and analyzed to monitor and manage traffic and transportation systems, power plants, utilities, water supply networks, information systems, and other community services. The smart city concept integrates information and communication technology (ICT), and various physical devices connected to the IoT (Internet of Things) network to optimize the efficiency of city operations and services. Smart city technology allows city officials to interact directly with both community and city infrastructure.

One or more vehicles on the road may form a local vehicular cloud, which consists of a group of cars, buses, and trucks. These vehicles may carry network endpoint devices to enable them as a network access point such as Wi-Fi or 5G hot-spots. Other vehicles may access the Wi-Fi endpoints for the Internet information. Unlike the Internet cloud, which is created and maintained by a cloud provider, the vehicle cloud is temporarily created by interconnecting resources available in the vehicles and/or a combination of vehicles with roadside units (RSUs). Alternatively, more and more vehicles, such as electric vehicles, are constantly connected to the broadband wireless interne connection in order to provide entertainment and self driving capabilities to the vehicles.

SUMMARY

According to one embodiment, a method, computer system, and computer program product for dynamic vehicle cloud services is provided. The present invention may include a computer identifies an event in an area. The computer predicts a demand for one or more cloud services for the event. The computer identifies a vehicle in an area of the event, where the vehicle have a dynamic vehicle cloud server and the computer caches the one or more cloud services for the event to the dynamic vehicle cloud server.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
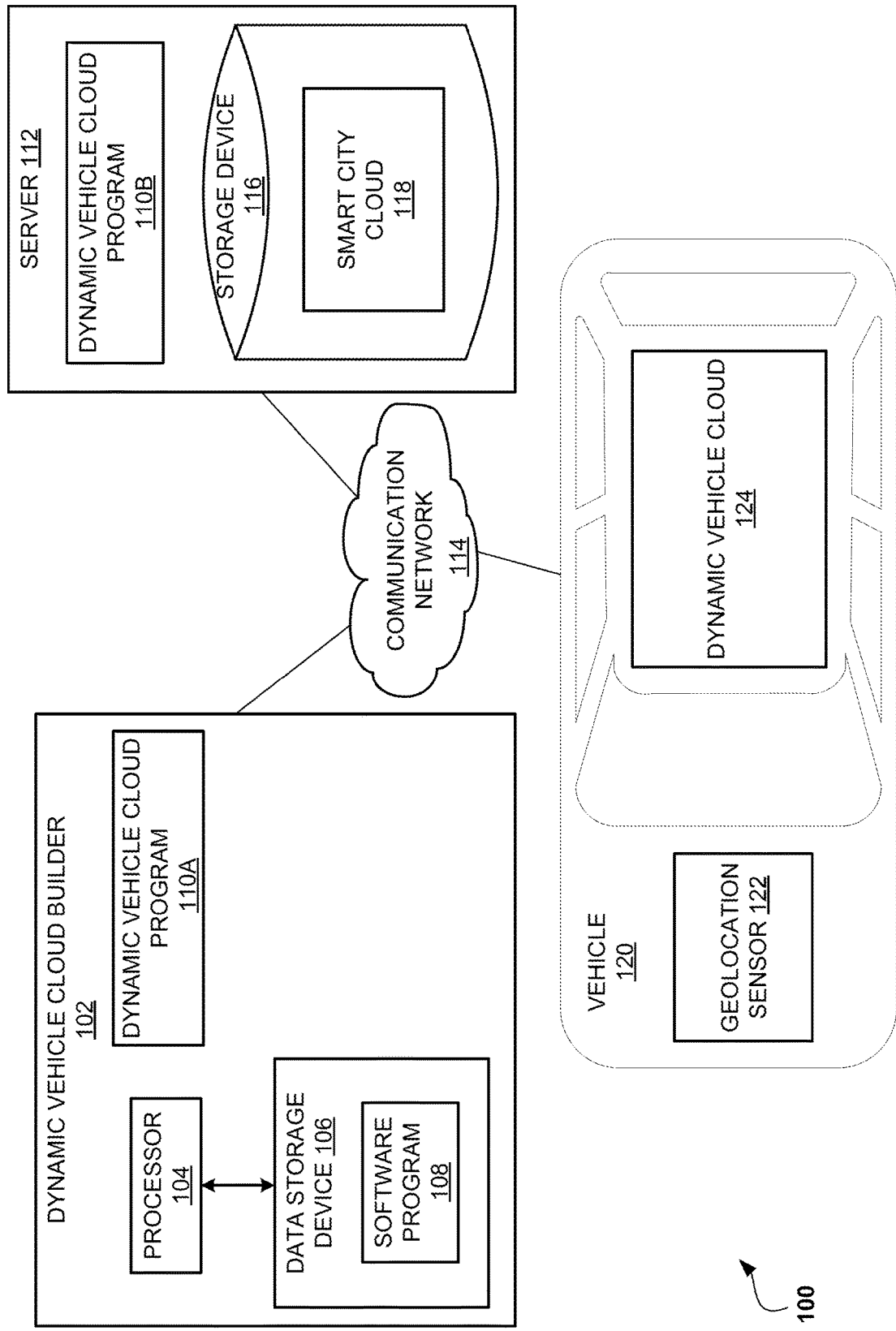
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to context aware cloud service availability. The following described exemplary embodiments provide a system, method, and program product to, among other things, to utilize a dynamic cloud infrastructure on one or more vehicles in a specific geolocation based on determining an overload in a cloud infrastructure. Therefore, the present embodiment has the capacity to improve the technical field of cloud services by identifying an event that previously resulted in an overload to the cloud in incentivize or utilize vehicles in the geolocation to provide cloud services in order to enable uninterrupted services of the cloud in the area.

As previously described, one or more vehicles on the road may form local vehicular cloud, which consists of a group of cars, buses, and trucks. These vehicles may carry a network endpoint devices to enable them as network access point such as Wi-Fi or 5G hot-spots. Other vehicles may access the Wi-Fi endpoints for the Internet information. Unlike the Internet cloud, which is created and maintained by a cloud provider, the vehicle cloud is temporarily created by interconnecting resources available in the vehicles and/or a combination of vehicles with roadside units (RSUs).

During an event in a defined geolocation, such as a concert in a city, a demand to specific cloud services may create a bottleneck or cause a complete crash in cloud infrastructure. As such, it may be advantageous to, among other things, implement a system that based on predicted demand of required cloud services in any geo-location range, will proactively deploy temporary data centers using a vehicular cloud so that, the sudden increase in demand for cloud resources may be addressed and the services will continue a normal operation.

According to one embodiment, a system may predict the demand for cloud services during an event and cache the one or more cloud services to one or more vehicles in the area in order to provide the services during the event when the available infrastructure is overwhelmed by the number of requests from the users attending the event.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to improve cloud infrastructure during surging demand by utilizing vehicles that have capabilities to host and run cloud services.

Referring to FIG. 1, an exemplary networked computer environment 100 is depicted, according to at least one embodiment. The networked computer environment 100 may include dynamic vehicle cloud builder 102, vehicle 120 and a server 112 interconnected via a communication network 114. According to at least one implementation, the networked computer environment 100 may include a plurality of dynamic vehicle cloud builders 102, vehicles 120, and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Dynamic vehicle cloud builder 102 may include a processor 104 and a data storage device 106 that is enabled to host and run a software program 108 and a dynamic vehicle cloud (DVC) program 110A and communicate with the server 112 via the communication network 114, in accordance with one embodiment of the invention. Dynamic vehicle cloud builder 102 may be, for example, a mobile device, a telephone, a personal digital assistant, a netbook, a laptop computer, a tablet computer, a desktop computer, or any type of computing device capable of running a program and accessing a network. In another embodiments, the dynamic vehicle cloud builder 102 may be a virtual machine that is incorporated in one or more servers such as server 112 or vehicle 120. As will be discussed with reference to FIG. 4, the dynamic vehicle cloud builder 102 may include internal components 402*a* and external components 404*a*, respectively.

The server computer 112 may be a laptop computer, netbook computer, personal computer (PC), a desktop computer, or any programmable electronic device or any network of programmable electronic devices capable of hosting and running a DVC program 110B and a database 116 and communicating with the dynamic vehicle cloud builder 102 via the communication network 114, in accordance with embodiments of the invention. As will be discussed with reference to FIG. 4, the server computer 112 may include internal components 402*b* and external components 404*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The vehicle 120 may be any machine or moving device that incorporates a geolocation sensor 122 and capable of hosting and running dynamic vehicle cloud 124. The geolocation sensor 122 may be a Global Positioning Sensor (GPS), or any other sensor capable of identifying a geographic location of a vehicle 120. The dynamic vehicle cloud 124 may be a computing device that is enabled to run cloud services that may be accessed by a user through communication network 114. For example, dynamic vehicle cloud 124 may be a server such as server 112 that hosts and runs software that enables execution and operation of cloud services.

According to the present embodiment, the DVC program 110A, 110B may be a program capable of identifying a required cloud services and after establishing dynamic vehicle cloud caching the required cloud services to the VCN. The DVC program 110A, 110B method is explained in further detail below with respect to FIG. 3.

Figure 2:
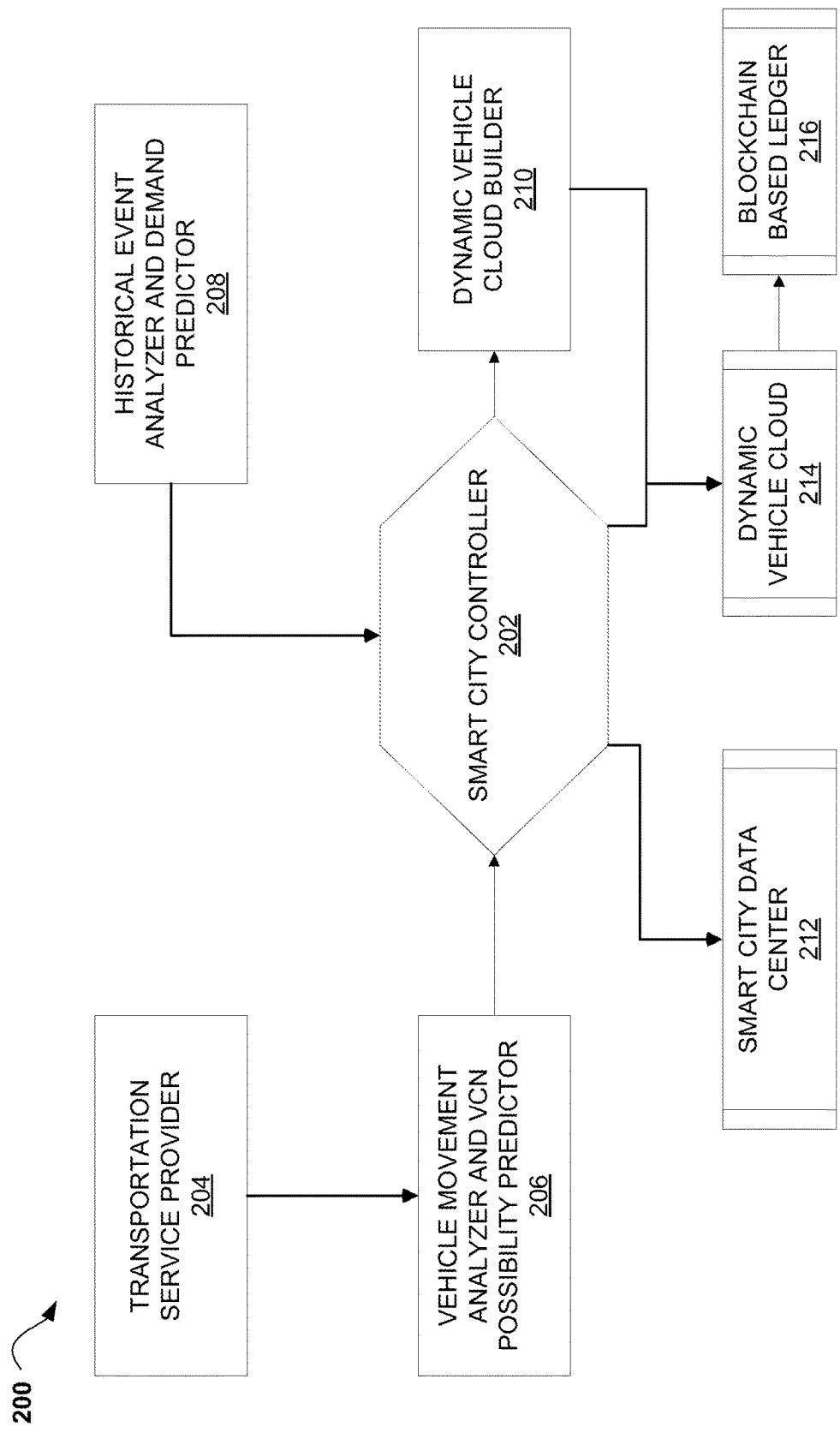
FIG. 2 is a block diagram of context aware cloud service availability in a smart city according to at least one embodiment.

Referring now to FIG. 2, a block diagram of context aware cloud service availability in a smart city 200 is depicted according to at least one embodiment. According to an example embodiment, the context aware cloud service availability in a smart city 200 may include hardware and software components such as a smart city controller 202 that may be a server, such as server 112, that handles the smart city cloud operations. The smart city controller may have a local regional cloud capacity based on a datacenter that may be hosted on the server or enabled by one or more cloud providers. The smart city controller 202 may receive data from an historical event analyzer and demand predictor 208. The historical event analyzer and demand predictor 208 may store and keep track of all the events in smart city and enables correlation between events and cloud capacity and services required for each event. According to an example embodiment, historical event analyzer and demand predictor 208 may communicate with the smart city controller 202 and measure current capacity and predict additional requirements of cloud capacity due to an event.

A transportation service provider 204 may be a computing device with software that is capable of determining and predicting location of one or more vehicles, such as vehicle 120 in the smart city and determine each vehicle location from the geolocation sensor 122. A vehicle movement analyzer and Vehicle Cloud Network (VCN) possibility predictor 206 may identify a set of vehicles along with a current geolocation and check whether a vehicle cloud may be established. In a smart city there may be multiple VCNs at the same time thus vehicle movement analyzer and VCN possibility predictor 206 may check the speed of each vehicle and whether the vehicle is in a predefined network area for building a cloud for the event or expected demand surge. The vehicle movement analyzer and VCN possibility predictor 206 may check direction of each vehicle and determine time the vehicle will move within the predetermined area and determine whether the vehicle has resources to share and provide all of the data to smart city controller 202. The smart city controller 202 may control the smart city data center 212 and determine whether the resources of the smart city data center 212 will be sufficient for the event and identify the services that require backup or scalability. The smart city controller 202 may use a dynamic vehicle cloud builder 210 to transfer or scale one or more services of the smart city data center 212 to the one or more available VCNs.

The smart city controller 202 may build one or more vehicle clouds using the data and the vehicle cloud may be linked to roadside cloud infrastructure that may connect dynamic vehicle cloud 214 to the cloud. The smart city controller 202 may also dynamically update and change the capacity of the services based on the movement of vehicles in the area. When a vehicle is moving out of the area, the clean operation may be commenced to clean the dynamic vehicle cloud 124. According to an example embodiment, a blockchain based ledger 216 may be maintained to identify a timeframe that each vehicle provided for the cloud services, and, accordingly, enable renting and or other timeframe payment systems in order to provide a payment to the vehicles for sharing the cloud services.

Figure 3:
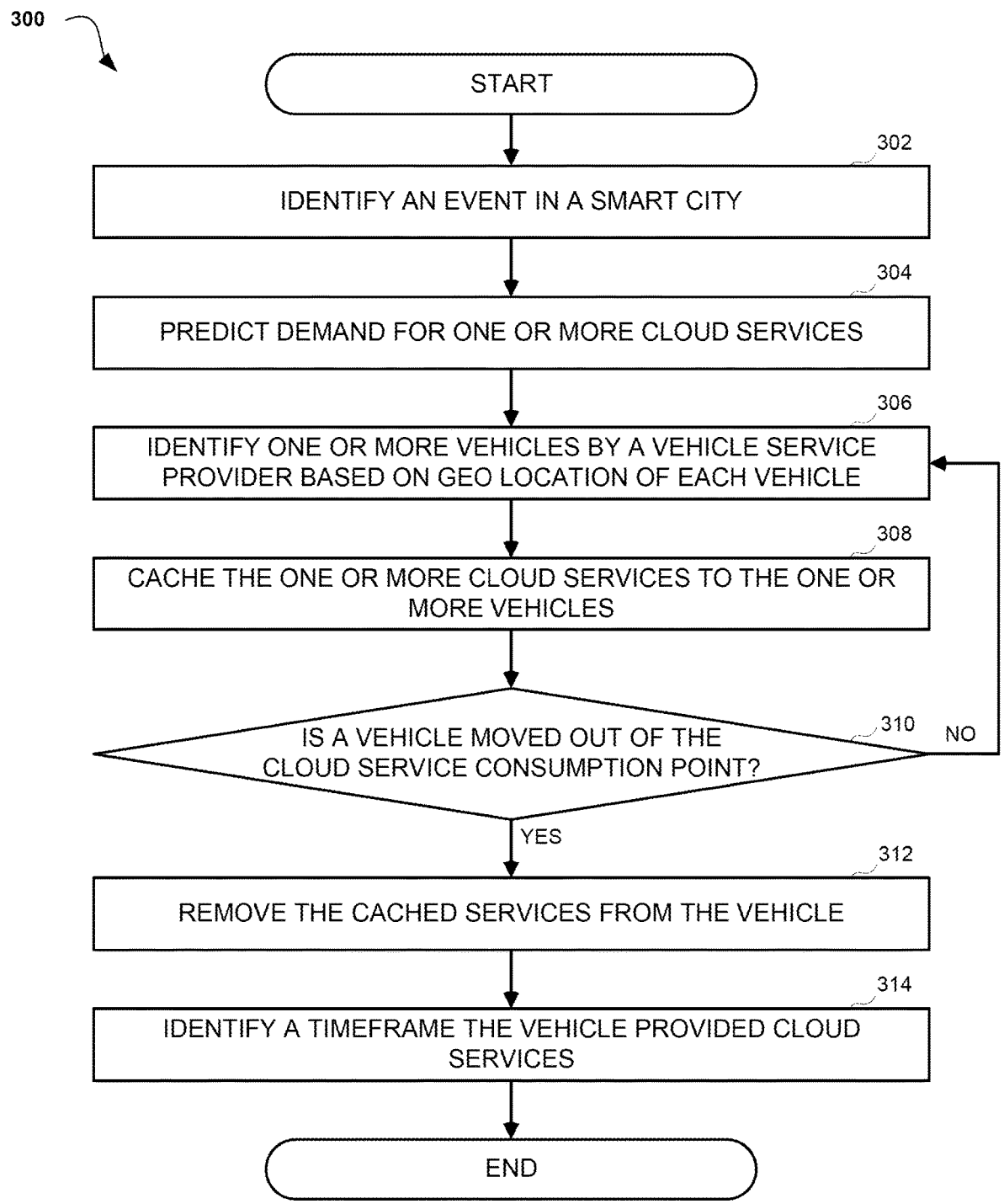
FIG. 3 is an operational flowchart illustrating a context aware dynamic vehicle cloud process according to at least one embodiment.

Referring now to FIG. 3, an operational flowchart illustrating a context aware dynamic vehicle cloud process 300 is depicted according to at least one embodiment. At 302, the DVC program 110A, 110B identifies an event is a smart city. According to an example embodiment, the DVC program 110A, 110B may search the interne for events scheduled in a specific geographic location.

Next, at 304, the DVC program 110A, 110B predicts demand for one or more cloud services. According to an example embodiment, the DVC program 110A, 110B may monitor the demand of cloud services during events and store in an internal database the demand for cloud services and, when a new event is identified, predict the demand based on previous demand for similarly identified events. For example, if a big concert is scheduled, the DVC program 110A, 110B may predict the demand for cloud services based on the demand that was observed during a previous concert under similar circumstances.

Then, at 306, the DVC program 110A, 110B identifies one or more vehicles by a vehicle service provider based on geolocation of each vehicle. According to an example embodiment, during an enrollment process, the DVC program 110A, 110B may request each owner of the vehicle to opt in for the services using a graphical user interface (GUI). Then, the DVC program 110A, 110B may identify the one or more vehicles based on their geolocations received from the geolocation sensor 122. In another embodiment, the DVC program 110A, 110B may identify whether the one or more vehicles are parked or moving through the required area and prioritize the vehicles that are parked in the requested area over the vehicles that are moving through the area.

Next, at 308, the DVC program 110A, 110B caches the one or more cloud services to the identified one or more vehicles. According to an example embodiment, the DVC program 110A, 110B may cache the one or more cloud services to the identified one or more vehicles in order to provide the services during peaking demand caused by the event. As previously mentioned with respect to FIG. 2, the cached services are determined based on the previous demands during similar events and current capabilities of the available cloud infrastructure. When a demand for one or more services is above the capabilities of the available infrastructure, these services may be added by the DVC program 110A, 110B to the cached cloud services.

Then, at 310, the DVC program 110A, 110B determines whether a vehicle of one or more identified vehicles moved out of the cloud service consumption area. According to an example embodiment, the consumption area may be identified as a circumference with a predetermined radius from the location of the event. If the DVC program 110A, 110B determines that the vehicle moved out of the cloud service consumption area (step 310, "YES" branch), the DVC program 110A, 110B may continue to step 312 to remove the cached services from the vehicle. If the DVC program 110A, 110B determines that the vehicle of one or more identified vehicles did not move out of the cloud service consumption area (step 310, "NO" branch), the DVC program 110A, 110B may return to step 306 to identify one or more vehicles by a vehicle service provider based on geolocation of each vehicle.

Next, at 312, the DVC program 110A, 110B removes cached services from the vehicle. According to an example embodiment, the DVC program 110A, 110B may send a command to the vehicle to remove and stop the service it was providing when the demand is back to regular or when the vehicle leaves the area of the event.

Then, at 314, the DVC program 110A, 110B identifies a timeframe the vehicle provided cloud services. According to an example embodiment, the DVC program 110A, 110B may store the timeframe of when each of the one or more vehicles were used to provide cloud services for the smart city. The timeframe may be used for accounting with the owners of the vehicles for providing the required infrastructure. For example, the DVC program 110A, 110B may pay the vehicle owner for each hour the vehicle is used for the cloud services. In another embodiment, the DVC program 110A, 110B may incentivize the owner of the vehicle by giving a discount such as free gas, free charging spot, or free parking closer to the geolocation of the event for the vehicle that acts as a cloud server.

It may be appreciated that FIG. 3 provides only an illustration of one implementation and does not imply any limitations with regard to how different embodiments may be implemented. Many modifications to the depicted environments may be made based on design and implementation requirements.

Figure 4:
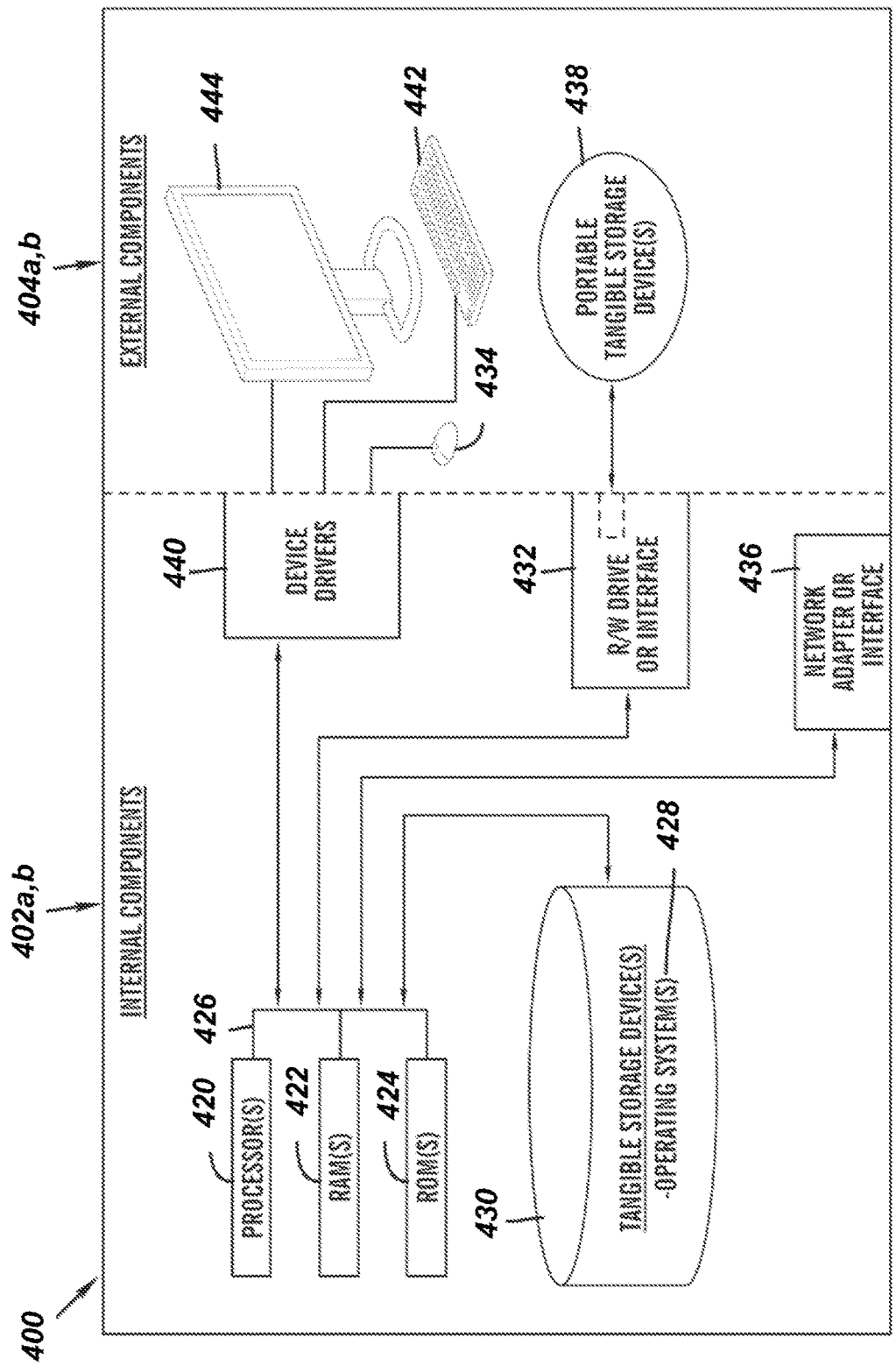
FIG. 4 is a block diagram of internal and external components of computers and servers depicted in FIG. 1 according to at least one embodiment.

FIG. 4 is a block diagram 400 of internal and external components of the dynamic vehicle cloud builder 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The dynamic vehicle cloud builder 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the DVC program 110A in the dynamic vehicle cloud builder 102, and the DVC program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the DVC program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the DVC program 110A in the dynamic vehicle cloud builder 102 and the DVC program 110B in the server 112 can be downloaded to the dynamic vehicle cloud builder 102 and the server 112 from an external computer via a network (for example, the Internet, a local area network or other, wide area network) and respective network adapters or interfaces 436. From the network adapters or interfaces 436, the software program 108 and the DVC program 110A in the dynamic vehicle cloud builder 102 and the DVC program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
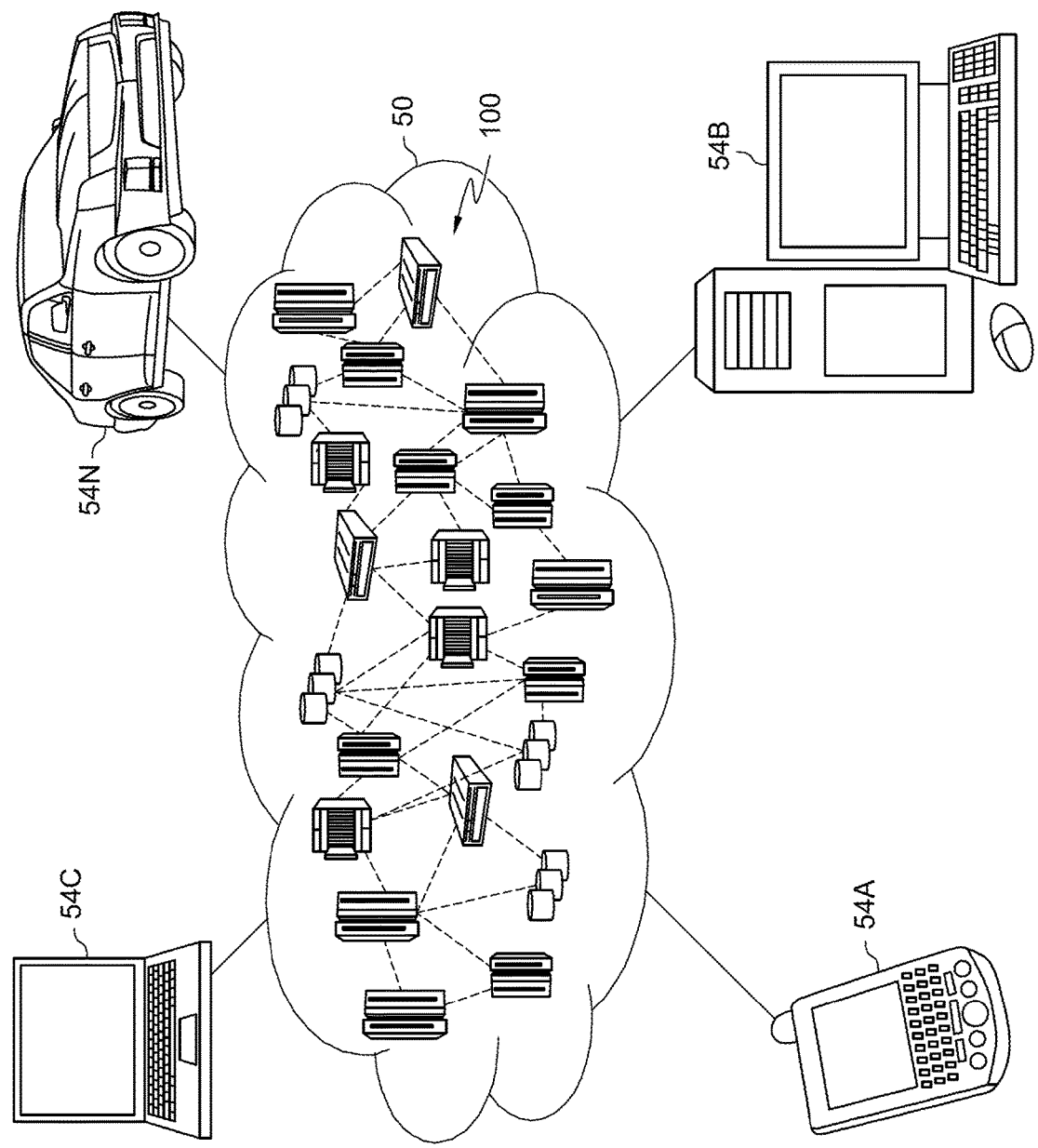
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
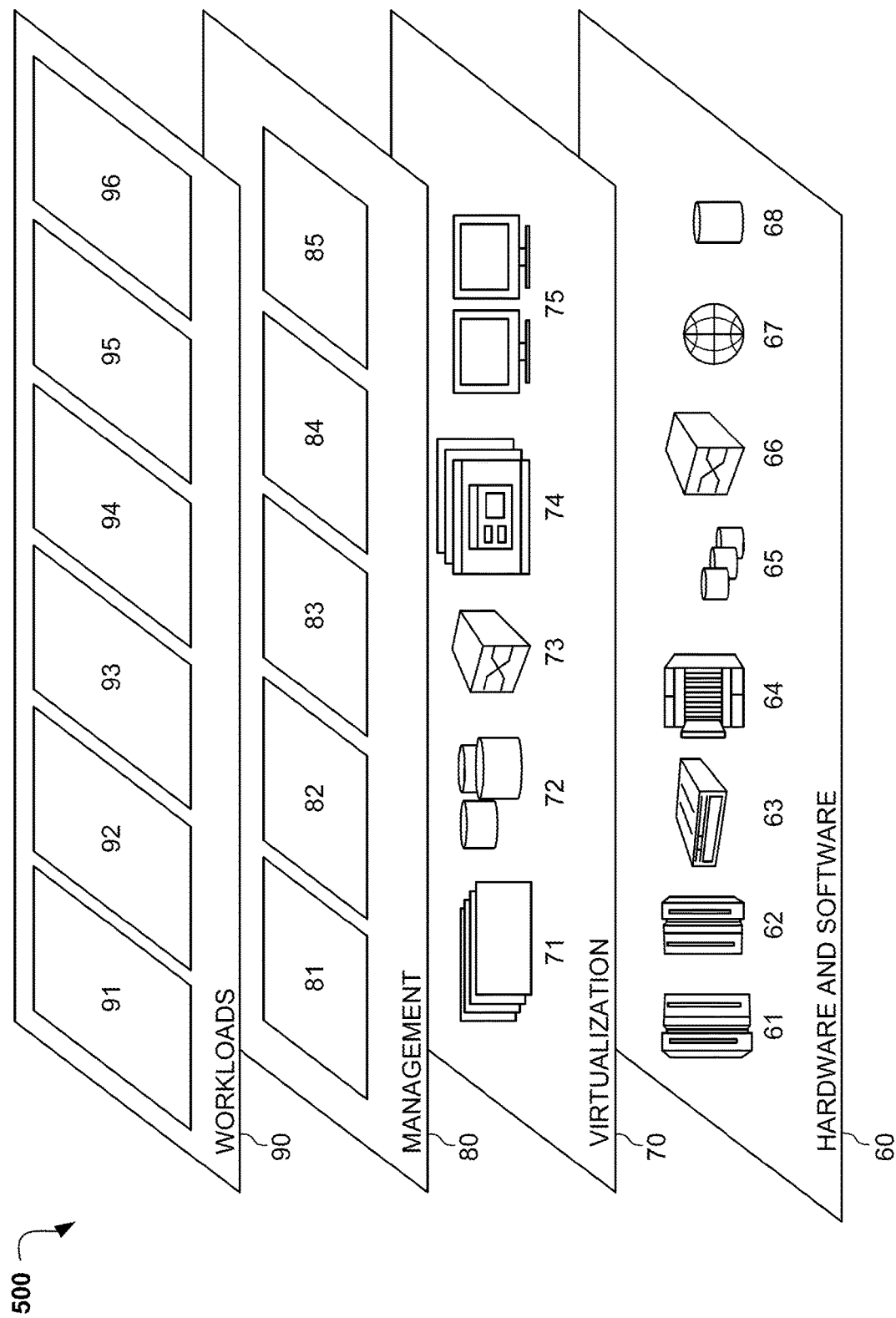
FIG. 6 depicts abstraction model layers according to an embodiment of the present invention.

Referring now to FIG. 6, a set of functional abstraction layers 500 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic vehicle cloud services 96. Dynamic vehicle cloud services 96 may relate to predicting a demand for one or more services in an area during an event and caching this services to one or more vehicles in the area that may store and operate the cloud services during the event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamic vehicle cloud services, the method comprising:
    identifying an event in an area;
    predicting a demand for one or more cloud services for the event based on a previous recorded demand for one or more similar identified events stored in an internal database and an available cloud infrastructure of the area;
    identifying a plurality of vehicles in the area of the event, wherein each of the plurality of vehicles has a dynamic vehicle cloud server;
    caching the one or more cloud services for the event to the dynamic vehicle cloud server, wherein at least a portion of the plurality of vehicles are utilized in providing the one or more cloud services based on the demand predicted; and
    determining at least one vehicle left a predetermined radius from a geolocation of the event, causing the dynamic vehicle cloud server to end the one or more cloud services for the at least one vehicle.

2. The method of claim 1, further comprising:
    determining a timeframe the dynamic vehicle cloud server for the at least one vehicle was used to provide the one or more cloud services.

3. The method of claim 2, further comprising:
    providing a payment to an owner of the at least one vehicle for the timeframe the dynamic vehicle cloud server was used to provide the one or more cloud services.

4. The method of claim 1, further comprising:
    identifying at least one vehicle within the plurality of vehicles in the area of the event in which the dynamic vehicle cloud server is not being utilized; and
    caching the one or more cloud services for the event to the dynamic vehicle cloud server of the at least one vehicle.

5. The method of claim 4, further comprising:
    providing one or more incentives to an owner of the at least one vehicle to provide required infrastructure.

6. The method of claim 1, wherein the portion of the plurality of vehicles utilized in providing the one or more cloud services are prioritized based on their geolocations and movement.

7. The method of claim 1, wherein the owner of each of the plurality of vehicles identified has opted in for providing the one or more cloud services using a graphical user interface.

8. A computer system for dynamic vehicle cloud services, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying an event in an area;

predicting a demand for one or more cloud services for the event based on a previous recorded demand for one or more similar identified events stored in an internal database and an available cloud infrastructure of the area;

identifying a plurality of vehicles in the area of the event, wherein each of the plurality of vehicles has a dynamic vehicle cloud server;

caching the one or more cloud services for the event to the dynamic vehicle cloud server, wherein at least a portion of the plurality of vehicles are utilized in providing the one or more cloud services based on the demand predicted; and determining at least one vehicle left a predetermined radius from a geolocation of the event, causing the dynamic vehicle cloud server to end the one or more cloud services for the at least one vehicle.

9. The computer system of claim 8, further comprising:

determining a timeframe the dynamic vehicle cloud server for the at least one vehicle was used to provide the one or more cloud services.

10. The computer system of claim 9, further comprising:

providing a payment to an owner of the at least one vehicle for the timeframe the dynamic vehicle cloud server was used to provide the one or more cloud services.

11. The computer system of claim 8, further comprising:

identifying at least one vehicle within the plurality of vehicles in the area of the event in which the dynamic vehicle cloud server is not being utilized; and caching the one or more cloud services for the event to the dynamic vehicle cloud server of the at least one vehicle.

12. The computer system of claim 11, further comprising:

providing one or more incentives to an owner of the at least one vehicle to provide required infrastructure.

13. The computer system of claim 8, wherein the portion of the plurality of vehicles utilized in providing the one or more cloud services are prioritized based on their geolocations and movement.

14. The computer system of claim 8, wherein the owner of each of the plurality of vehicles identified has opted in for providing the one or more cloud services using a graphical user interface.

15. A non-transitory computer program product for dynamic vehicle cloud services, the non-transitory computer program product comprising:

one or more computer-readable tangible storage medium and program instructions stored on at least one of the one or more tangible storage medium, the program instructions executable by a processor, the program instructions comprising:

program instructions to identify an event in an area;

program instructions to predict a demand for one or more cloud services for the event based on a previous recorded demand for one or more similar identified events stored in an internal database and an available cloud infrastructure of the area;

program instructions to identify a plurality of vehicles in the area of the event, wherein each of the plurality of vehicles has a dynamic vehicle cloud server;

program instructions to cache the one or more cloud services for the event to the dynamic vehicle cloud server, wherein at least a portion of the plurality of vehicles are utilized in providing the one or more cloud services based on the demand predicted; and program instructions to determine at least one vehicle left a predetermined radius from a geolocation of the event, causing the dynamic vehicle cloud server to end the one or more cloud services for the at least one vehicle.

16. The non-transitory computer program product of claim 15, further comprising:

program instructions to determine a timeframe the dynamic vehicle cloud server for the at least one vehicle was used to provide the one or more cloud services.

17. The non-transitory computer program product of claim 16, further comprising:

program instructions to provide a payment to an owner of the at least one vehicle for the timeframe the dynamic vehicle cloud server was used to provide the one or more cloud services.

18. The computer program product of claim 15, further comprising:

program instructions to identify at least one vehicle within the plurality of vehicles in the area of the event in which the dynamic vehicle cloud server is not being utilized; and program instructions to cache the one or more cloud services for the event to the dynamic vehicle cloud server of the at least one vehicle.

19. The non-transitory computer program product of claim 18, further comprising:

program instructions to provide one or more incentives to an owner of the at least one vehicle to provide required infrastructure.

20. The non-transitory computer program product of claim 15, wherein the portion of the plurality of vehicles utilized in providing the one or more cloud services are prioritized based on their geolocations and movement.

* * * * *